United States Patent
Li et al.

(10) Patent No.: US 9,982,122 B2
(45) Date of Patent: May 29, 2018

(54) POLYOLEFIN BLEND COMPOSITION AND ARTICLES MADE THEREFROM

(71) Applicant: DOW GLOBAL TECHNOLOGIES LLC, Midland, MI (US)

(72) Inventors: Guang Ming Li, Sugar Land, TX (US); Colin LiPiShan, Pearland, TX (US); Kim L. Walton, Lake Jackson, TX (US); Raymond L. Laakso, Jr., St. Francisville, LA (US); Walter J. Brown, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 379 days.

(21) Appl. No.: 14/391,318

(22) PCT Filed: Apr. 2, 2013

(86) PCT No.: PCT/US2013/034879
§ 371 (c)(1),
(2) Date: Oct. 8, 2014

(87) PCT Pub. No.: WO2013/154860
PCT Pub. Date: Oct. 17, 2013

(65) Prior Publication Data
US 2016/0083571 A1    Mar. 24, 2016

Related U.S. Application Data

(60) Provisional application No. 61/623,305, filed on Apr. 12, 2012.

(51) Int. Cl.
*C08L 23/14*    (2006.01)

(52) U.S. Cl.
CPC ............. *C08L 23/14* (2013.01); *C08L 23/142* (2013.01); *C08L 2205/025* (2013.01); *C08L 2205/03* (2013.01)

(58) Field of Classification Search
CPC ............... C08L 23/142; C08L 23/0815; C08L 2205/025; C08L 2205/03; C08L 23/14
See application file for complete search history.

(56) References Cited

U.S. PATENT DOCUMENTS

| | | | |
|---|---|---|---|
| 4,960,820 A | 10/1990 | Hwo | |
| 5,272,236 A | 12/1993 | Lai et al. | |
| 5,278,272 A | 1/1994 | Lai et al. | |
| 5,504,172 A | 4/1996 | Imuta et al. | |
| 6,054,544 A | 4/2000 | Finlayson et al. | |
| 6,335,410 B1 | 1/2002 | Finlayson et al. | |
| 6,525,157 B2 | 2/2003 | Cozewith et al. | |
| 6,639,020 B1 | 10/2003 | Brant | |
| 6,723,810 B2 | 4/2004 | Finlayson et al. | |
| 6,960,635 B2 | 11/2005 | Stevens et al. | |
| 8,217,112 B2 | 7/2012 | Lundmark et al. | |
| 2005/0234172 A1 | 10/2005 | Musgrave et al. | |
| 2007/0092704 A1* | 4/2007 | Patel | B32B 5/26 428/212 |
| 2009/0054861 A1 | 2/2009 | Watson et al. | |
| 2010/0216931 A1 | 8/2010 | Wevers et al. | |
| 2011/0124817 A1 | 5/2011 | Dias et al. | |
| 2012/0184676 A1 | 7/2012 | Gahleitner et al. | |
| 2012/0208961 A1 | 8/2012 | Carnahan et al. | |
| 2016/0194487 A1 | 7/2016 | Weaver et al. | |

FOREIGN PATENT DOCUMENTS

| | | |
|---|---|---|
| WO | 2000/01745 A1 | 1/2000 |
| WO | 2003016421 | 2/2003 |
| WO | 2004035681 A2 | 4/2004 |
| WO | 2007120147 A1 | 10/2007 |
| WO | 2009/067337 A1 | 5/2009 |

OTHER PUBLICATIONS

Parvinder Walia, Inspire At-Press TPO Technology, Antec, 2009, pp. 1443-1447.
International Search Report and Written Opinion for PCT/US2013/034879, dated Jun. 6, 2013, pp. 1-7.
Inernational Preliminary Report on Patentability for PCT/US2013/034879, dated Oct. 14, 2014, pp. 1-5.

* cited by examiner

Primary Examiner — Lawrence Ferguson

(57) ABSTRACT

The instant invention provides a polyolefin blend composition, process for producing the same, and articles made therefrom. The polyolefin blend composition according to the present invention comprises: (a) from 75 to 97 percent by weight of one or more random propylene copolymers having a DSC melting point in the range of from 120° C. to 160° C., and a melt flow rate (MFR) in the range of from 1 to 120 g/10 minutes; (b) from 3 to 25 percent by weight of one or more ethylene ?-olefin copolymers having a melt index (I2) in the range of from 100 to 1500 g/10 minutes, a density in the range of 0.860 to 0.910 g/cm3, and a molecular weight (Mw) in the range of from 10,000 to 50,000 g/mole, wherein said ethylene ?-olefin copolymer is homogenously branched copolymer, and wherein said ethylene ?-olefin copolymer is linear or substantially linear; (c) optionally from 5 to 15 percent by weight of one or more propylene ?-olefin interpolymers having a DSC melting point in the range of less than 110° C., a heat of fusion in the range of less than 50 Joules/gram, and a crystallinity in the range of from at least 1 percent by to 40 percent by weight, and a melt flow rate in the range of less than 80 g/10 minutes.

10 Claims, No Drawings

POLYOLEFIN BLEND COMPOSITION AND ARTICLES MADE THEREFROM

REFERENCE TO RELATED APPLICATIONS

The present application claims the benefit of U.S. Provisional Application No. 61/623,305, filed on Apr. 12, 2012.

FIELD OF INVENTION

The instant invention relates to a polyolefin blend composition, process for producing the same, and articles made therefrom.

BACKGROUND OF THE INVENTION

Polypropylenes are useful in a number of everyday articles such as, for example, storage containers, pails, and ice cream containers. However, one drawback to the use of polypropylene homopolymers and/or random polypropylene copolymers (RCP) in such end use applications is their relatively high glass transition temperature, approximately about 0° C. Such relatively high glass transition temperature renders these materials brittle, especially at sub-zero temperatures. RCP is typically the material of choice for injection molded clear containers. Due the inherent high crystallinity and high glass transition temperature of RCP, the injection molded articles made of RCP typically have poor impact strength; thus, requiring impact modification. For example, at low temperature ranges, for example less than approximately 0° C., the low impact strength of RCP injection molded articles typically causes significant product failure during the transportation and handling of the product. Addition of a plasticizer and/or elastomer, as one or more impact modifiers, to such materials is one way to improve such properties, e.g. impact strength and toughness. However, the addition of impact modifiers, the clarity of the molded articles may be severely compromised and can be very hazy. Traditionally, elastomers such as ethylene alpha-olefin-based impact modifiers used in clarity applications have a matching refractive index to the RCP and are limited to the range of 0.90 g/cc.

Despite the research efforts in improving the properties of such injection molded articles, there is still a need for composition providing both improved clarity and toughness of in injection molded articles.

SUMMARY OF THE INVENTION

The instant invention provides a polyolefin blend composition, process for producing the same, and articles made therefrom.

In one embodiment, the instant invention provides a polyolefin blend composition comprising: (a) from 75 to 97 percent by weight of one or more random propylene copolymers (RCP) having a DSC melting point in the range of from 120° C. to 160° C., and a melt flow rate (MFR) in the range of from 1 to 120 g/10 minutes; (b) from 3 to 25 percent by weight of one or more an ethylene α-olefin copolymers having a melt index ($I_2$) in the range of from 100 to 1500 g/10 minutes, a density in the range of 0.860 to 0.910 g/cm$^3$, and a molecular weight ($M_w$) in the range of from 10,000 to 50,000 g/mole, wherein said ethylene α-olefin copolymer is homogenously branched copolymer, and wherein said ethylene α-olefin copolymer is linear or substantially linear; (c) optionally from 5 to 15 percent by weight of one or more of one or more a propylene α-olefin interpolymers having a DSC melting point in the range of less than 110° C., a heat of fusion in the range of less than 50 Joules/gram, and a crystallinity in the range of from at least 1 percent by to 40 percent by weight, and a melt flow rate in the range of less than 80.

In an alternative embodiment, the instant invention further provides a process for for producing a polyolefin blend composition comprising: (1) selecting one or more random propylene copolymers (RCP) having a DSC melting point in the range of from 120° C. to 160° C., and a melt flow rate (MFR) in the range of from 1 to 120 g/10 minutes; (2) selecting one or more ethylene α-olefin copolymer having a melt index ($I_2$) in the range of from 100 to 1500 g/10 minutes, a density in the range of 0.860 to 0.910 g/cm$^3$, and a molecular weight ($M_w$) in the range of from 10,000 to 50,000 g/mole, wherein said ethylene α-olefin copolymer is homogenously branched copolymer, and wherein said ethylene α-olefin copolymer is linear or substantially linear; (3) optionally selecting one or more optional propylene α-olefin interpolymers having a DSC melting point in the range of less than 110° C., a heat of fusion in the range of less than 50 Joules/gram, and a crystallinity in the range of from at least 1 percent by to 40 percent by weight, and a melt flow rate in the range of less than 80; (5) contacting said one or more random propylene copolymers, said one or more ethylene α-olefin copolymers, and optionally said one or more propylene α-olefin interpolymers; and (6) thereby producing said polyolefin blend composition.

In another alternative embodiment, the instant invention further provides an article comprising the polyolefin blend composition, as described hereinabove.

In an alternative embodiment, the instant invention provides a polyolefin blend composition, method of producing the same, and articles made therefrom, in accordance with any of the preceding embodiments, except that the polyolefin blend composition is characterized by one or more of the followings: (a) a haze in the range of from less than 55 percent, when said composition is formed into a plaque having a thickness of at least 2 mm; (b) a normalized impact strength, measured at 23° C., in the range of from greater than 5 kJ/m$^2$; (c) a normalized weld-line in the range of from greater 100 lbf; and/or (d) elongation to break of the weld line greater than 1.5 percent.

DETAILED DESCRIPTION OF THE INVENTION

The instant invention provides a polyolefin blend composition, process for producing the same, and articles made therefrom. The polyolefin blend composition according to the present invention comprises: (a) from 75 to 97 percent by weight of one or more random propylene copolymers having a DSC melting point in the range of from 120° C. to 160° C., and a melt flow rate (MFR) in the range of from 1 to 120 g/10 minutes; (b) from 3 to 25 percent by weight of one or more ethylene α-olefin copolymers having a melt index ($I_2$) in the range of from 100 to 1500 g/10 minutes, a density in the range of 0.860 to 0.910 g/cm$^3$, and a molecular weight ($M_w$) in the range of from 10,000 to 50,000 g/mole, wherein said ethylene α-olefin copolymer is homogenously branched copolymer, and wherein said ethylene α-olefin copolymer is linear or substantially linear; (c) optionally from 5 to 15 percent by weight of one or more propylene α-olefin interpolymers having a DSC melting point in the range of less than 110° C., a heat of fusion in the range of less than 50 Joules/gram, and a crystallinity in the range of from at least 1 percent by to 40 percent by weight, and a melt flow rate in the range of less than 80 g/10 minutes. The polyolefin blend composition according to the present invention is characterized by one or more of the followings: (a) a haze in the range of from less than 55 percent, for example 10 to 55 percent, or 15 to 45 percent, or 20 to 40 percent, when the polyolefin blend composition is formed into a plaque having a thickness of at least 2 mm; (b) a normalized impact strength, measured at 23° C., in the range of from greater than 5 kJ/m$^2$, for example 5 to 60 kJ/m$^2$5, or from 5 to 30 kJ/m$^2$, or from 5 to 30 kJ/m$^2$, or from 5 to 15 kJ/m$^2$; (c) a normalized weld-line in the range of from greater 100 lbf, for example from 100 to 300 lbf, or from 100 to 250 lbf, or from 100 to 200 lbf, and/or (d) an elongation at break of the weld line greater than 1.5 percent.

RCP Component

The polyolefin blend composition according to the present invention comprises (a) from 75 to 97 percent, for example 81 to 94 percent, or in the alternative from 85 to 91 percent, by weight of one or more random propylene copolymers having a DSC melting point in the range of from 120° C. to 160° C., for example, from 130° C. to 160° C., or from 141° C. to 159° C., and a melt flow rate (MFR) in the range of from 1 to 120 g/10 minutes, for example, from 5 to 120 g/10 minutes, or from 11 to 99 g/10 minutes, or from 19 to 84 g/10 minutes, measured according to ASTM-D 1238, (230° C./2.16 kg). Such RCP materials are commercially available under the tradename Braskem PP R7021-50RNA from Braskem America Inc. or Formolene 7320A from Formosa Plastics Corporation, USA.

Ethylene α-Olefin Copolymer(s) Component

The polyolefin blend composition according to the present invention comprises (b) from 3 to 25 percent, for example, from 6 to 19 percent, or from 9 to 15 percent by weight of one or more an ethylene α-olefin copolymers having a melt index ($I_2$) in the range of from 100 to 1500 g/10 minutes, for example, from 201 to 1250 g/10 minutes, or from 450 to 1050 g/10 minutes, a density in the range of 0.860 to 0.910 g/cm$^3$, for example from 0.865 to 0.910 g/cm$^3$, or from 0.868 to 0.905 g/cm$^3$, and a molecular weight ($M_w$) in the range of from 10,000 to 50,000 g/mole, for example, from 15,000 to 45,000 g/mole, or from 17,000 to 35,000 g/mole, wherein the ethylene α-olefin copolymer is homogenously branched copolymer, and wherein the ethylene α-olefin copolymer is linear or substantially linear (236 or 272 patent). A substantially linear ethylene/α-olefin interpolymer (SLEP) is a homogeneously branched polymer and is described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone.

"Substantially linear," refers to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, more preferably from 0.05 long chain branches per 1000 total carbons to 2 long chain branch per 1000 total carbons, and especially from 0.3 long chain branches per 1000 total carbons to 1 long chain branch per 1000 total carbons.

The one or more ethylene α-olefin copolymers, individually and combined, have a Brookfield Viscosity in the ranger of from 3,000 to 60,000 mPa-s, for example 5,000 to 30,000 mPa-s measured at 177° C., spindle 31.

The ethylene α-olefin copolymers comprise greater than 50 mole percent by weight of units derived from ethylene. The ethylene α-olefin copolymers comprise from 5 to 20 mole percent by weight of units derived from one or more α-olefin comonomers. Such α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

Such ethylene α-olefin copolymers may be a polyolefin elastomer, for example commercially available under the tradename ENGAGE™ from The Dow Chemical Company or a polyolefin plastomer commercially available under the tradename AFFINITY™ from The Dow Chemical Company.

Propylene α-Olefin Interpolymer Component

The polyolefin blend composition according to the present invention comprises optionally from 2 to 15 percent, for example 4 to 12 percent, by weight of one or more propylene α-olefin interpolymers having a DSC melting point in the range of less than 110° C., for example from 0 to 100° C., or from 20 to 79° C., a heat of fusion in the range of less than 50 Joules/gram, for example from 5 to 45 Joules/gram, or from 10 to 40 Joules/gram, and a crystallinity in the range of from at least 1 percent, for example from at least 1 percent to 40 percent, or from 5 to 30 percent, or from 7 to 27 percent, by weight, and a melt flow rate in the range of less than 80 g/10 minutes, for example, from 2 to 50 g/10 minutes or from 5 to 30 g/10 minutes.

In certain other embodiments, the propylene α-olefin interpolymer is, for example, a semi-crystalline polymer having a melting point of less than 110° C. In another embodiment, the melting point is from 25 to 100° C. In another embodiment, the melting point is between 40 and 85° C.

In one particular embodiment, the propylene α-olefin interpolymer is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

In one embodiment, propylene/alpha-olefin interpolymer is a propylene/alpha-olefin copolymer, e.g. propylene/ethylene copolymer, may have a melt flow rate in the range of from less than 80 g/10 minutes, for example 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein with regards to propylene/alpha-olefin copolymers, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/alpha-olefin copolymers are further described in details in the U.S. Provisional Patent Application No. 60/988,999 and International Patent Application No. PCT/US08/082599, each of which is incorporated herein by reference.

In one embodiment the propylene/alpha-olefin copolymer is compounded with 15 percent or less by weight a propylene homopolymer having melt flow ratio in the range of from 1 to 50 g/10 minutes and a DSC melting point of 160 to 170° C., a random propylene copolymer (RCP) having melt flow ratio in the range of from 1 to 50 g/10 minutes and a DSC melting point of 140 to 160° C., an/or an ethylene α-olefin copolymer having a density in the range of 0.890 to 0.910 g/cm$^3$ and a melt index in the range of from 1 to 20 g/10 minutes.

Additional Components

The polyolefin blend composition may further comprise additional components such as additives. Such additives include, but are not limited to, antistatic agents, color enhancers, dyes, lubricants, fillers, e.g. talc, pigments, primary antioxidants, secondary antioxidants, processing aids, UV stabilizers, anti-slip agents, anti-blocking agents, and combinations thereof. The inventive polyolefin blend composition may contain any amount one or more of these additives. The inventive polyolefin blend composition may comprise from about 0 to about 10 percent by the combined weight of such additives, based on the weight of the polyolefin blend composition including such additives.

Process for Producing the Polyolefin Blend Composition

In the process for producing the polyolefin blend composition, the components can dry blended and then formed into molded articles, or in the alternative, the components can be melt blended, and then formed into molded articles, or in the alternative, the components can be blended and continuously formed into molded articles. Blending devices are known to person ordinary skill in the art, and include, but are not limited to, dry blenders, extruders, batch mixer, roll mills, Banbury mixers. In one embodiment, the components are dry blended at the feed hopper during the molding process, e.g. injection molding process, thereby significantly improving the dispersion of the ethylene α-olefin copolymer component and optionally the propylene α-olefin interpolymer into the RCP matrix. As a result the dispersion of the ethylene α-olefin copolymer component and optionally the propylene α-olefin interpolymer component into the RCP matrix are fine dispersions with domains (shortest axis) in the range of from less than 150 nm.

In one embodiment the process for producing the polyolefin blend composition comprises: (1) selecting one or more random propylene copolymers having a DSC melting point in the range of from 120° C. to 160° C., and a melt flow rate (MFR) in the range of from 1 to 120 g/10 minutes; (2) selecting one or more ethylene α-olefin copolymers having a melt index ($I_2$) in the range of from 100 to 1500 g/10 minutes, a density in the range of 0.860 to 0.910 g/cm$^3$, and a molecular weight ($M_w$) in the range of from 10,000 to 50,000 g/mole, wherein the ethylene α-olefin copolymer is homogenously branched copolymer, and wherein the ethylene α-olefin copolymer is linear or substantially linear; (3) optionally selecting an optional propylene α-olefin interpolymer having a DSC melting point in the range of less than 110° C., a heat of fusion in the range of less than 45 Joules/gram, and a crystallinity in the range of from at least 1 percent by to 40 percent by weight, and a melt flow rate in the range of less than 80; (5) contacting said random propylene copolymer, said ethylene α-olefin copolymer, and optionally said propylene α-olefin interpolymer; and (6) thereby producing said polyolefin blend composition.

End-Use Applications

The polyolefin blend composition of the present invention can be formed into various articles including, but not limited to, storage device, e.g. totes and shipping containers; caps; films; sheets; toys; cups; pails; and/or other rigid and durable articles. At least a portion of such molded articles has a thickness in the range of from 1 mm to 5 mm.

The polyolefin blend composition of the present invention can be formed into various articles via various fabrication process, including but not limited to, injection molding process, compression molding process, extrusion process, calendering process, profile extrusion process, blown-film extrusion process, thermoform process, rotational molding process, and/or cast film process.

EXAMPLES

The following examples illustrate the present invention but are not intended to limit the scope of the invention.

Formulation Components are reported in table 1.

TABLE 1

| Formulation Component | | Density (g/cc) | MI (g/10 mins) @ 190° C. | MFR (g/10 mins) @ 230° C. |
|---|---|---|---|---|
| RCP 1 | Formolene 7320B | 0.90 | — | 20 |
| RCP 2 | Braskem PP R7021-50RNA | 0.90 | — | 50 |
| Ethylene α-Olefin Copolymer 1 | Ethylene/Octene Elastomer | 0.87 | 200 | — |
| Ethylene α-Olefin Copolymer 2 | AFFINITY ™ GA 1950 (Ethylene/Octene Elastomer) | 0.874 | 500 | — |
| Ethylene α-Olefin Copolymer 3 | Ethylene/Octene Elastomer | 0.887 | 1000 | — |
| Ethylene α-Olefin Copolymer 4 | ENGAGE ™ 8407 (Ethylene/Octene Elastomer) | 0.87 | 30 | — |
| Ethylene α-Olefin Copolymer 5 | ENGAGE ™ 8200 (Ethylene/Octene Elastomer) | 0.87 | 5 | — |
| Ethylene α-Olefin Copolymer 6 | ENGAGE ™ 8440 (Ethylene/Octene Elastomer) | 0.897 | 1.6 | — |
| Propylene α-Olefin Interpolymer | VERSIFY ™ 4301 (Propylene Ethylene Copolymer) | 0.867 | — | 25 |

Formulation components, as reported in Tables 1 and 2, were dry tumble blended to form comparative blend compositions A-D and inventive blend compositions 1-7.

TABLE 2

| Formulation Components | Comparative A | Comparative B | Comparative C | Comparative D | Inventive 1 | Inventive 2 | Inventive 3 | Inventive 4 | Inventive 5 | Inventive 6 | Inventive 7 |
|---|---|---|---|---|---|---|---|---|---|---|---|
| RCP 1 | 100.0 | 90.0 | 90.0 | — | 90.0 | — | — | 90.0 | — | — | — |
| RCP 2 | — | — | — | 90.0 | — | 90.0 | 90.0 | — | 96.0 | 90.0 | 84.0 |
| Ethylene α-Olefin Copolymer 5 | — | 10.0 | — | — | — | — | — | — | — | — | — |
| Ethylene α-Olefin Copolymer 4 | — | — | 10.0 | — | — | — | — | — | — | — | — |
| Ethylene α-Olefin Copolymer 6 | — | — | — | 5.0 | — | — | — | — | — | — | — |

TABLE 2-continued

| Formulation Components | Comparative A | Comparative B | Comparative C | Comparative D | Inventive 1 | Inventive 2 | Inventive 3 | Inventive 4 | Inventive 5 | Inventive 6 | Inventive 7 |
|---|---|---|---|---|---|---|---|---|---|---|---|
| Propylene α-Olefin Interpolymer | — | — | — | 5.0 | — | — | 5.0 | — | — | — | — |
| Ethylene α-Olefin Copolymer 1 | — | — | — | — | 10.0 | — | — | 10.0 | — | — | — |
| Ethylene α-Olefin Copolymer 3 | — | — | — | — | — | 10.0 | 5.0 | — | — | — | — |
| Ethylene α-Olefin Copolymer 2 | — | — | — | — | — | — | — | — | 4.0 | 10.0 | 16.0 |
| | 100.0 | 100.0 | 100.0 | 100.0 | 100.0 | 100.0 | 100.0 | 100.0 | 100.0 | 100.0 | 100.0 |

The comparative blend compositions A-D and inventive blend compositions 1-7 were formed into injection molded samples, comparative samples A-D and inventive samples 1-7, respectively, based on the following process and conditions reported in Table 3.

The comparative blend compositions A-D and inventive blend compositions 1-7 were injection molded using a Krasuss Maffei KM 110-390/390 CL Injection Molding Machine, equipped with a single shot mold base.

TABLE 3

| Barrel and Mold Temperatures | |
|---|---|
| Hopper zone (° C.) | 30 |
| Zone 1 Temperature (° C.) | 121 |
| Zone 2 Temperature (° C.) | 175 |
| Zone 3 Temperature (° C.) | 200 |
| Zone 4 Temperature (° C.) | 200 |
| Zone 5 Temperature (° C.) | 200 |
| Nozzle Temperature (° C.) | 190 |
| Mold Temperature (° F.) | 90 |
| Extruder | |
| RPM (1/min) | 100 |
| Backpressure (Bar) | 150 |
| Injection Molder | |
| Injection Speed (ccm/s) | 75 |
| Injection pressure (bar) | 2000 |
| Hold Pressure (Bar) | 300 |

The comparative samples A-D and inventive samples 1-7 were tested for various properties and those properties are reported in Tables 4 and 5.

TABLE 4

| | Flex | Haze 2 mm Thickness | | Izod @23° C. | | Izod @0° C. | | Izod @−20° C. | |
|---|---|---|---|---|---|---|---|---|---|
| Examples | Modulus 1% Secant | Average of Five Readings % | Std Dev of Five Readings % | Avg Strength kJ/m$^2$ | Std Dev Strength kJ/m$^2$ | Avg Strength kJ/m$^2$ | Std Dev Strength kJ/m$^2$ | Avg Strength kJ/m$^2$ | Std Dev Strength kJ/m$^2$ |
| Comparative A | — | 42.1 | 0.2 | 4.83 | 0.12 | 1.93 | 0.06 | 1.55 | 0.14 |
| Comparative B | — | 65.8 | 1.1 | 8.15 | 0.49 | 4.66 | 0.94 | 2.12 | 0.24 |
| Comparative C | — | 61 | 1.6 | 10.22 | 0.13 | 5.16 | 0.64 | 1.73 | 0.06 |
| Comparative D | 124 | 48 | — | 1.7 | — | 2.1 | — | 1.4 | — |
| Inventive 1 | — | 49.4 | 0.6 | 10.06 | 2.9 | 4.37 | 0.73 | 2.13 | 0.49 |
| Inventive 2 | 123 | 25 | — | 6.8 | — | 4.4 | — | 3.1 | — |
| Inventive 3 | 120 | 22 | — | 7.8 | — | 4.4 | — | 2.6 | — |
| Inventive 4 | — | 46 | 0.4 | 9.84 | 0.49 | 4.34 | 0.55 | 1.65 | 0.13 |
| Inventive 5 | 139 | 25 | — | 6.7 | — | 3.3 | — | 1.9 | — |
| Inventive 6 | 123 | 37 | — | 7.2 | — | 4.8 | — | 2.5 | — |
| Inventive 7 | 106 | 40 | — | 11 | — | 5.7 | — | 7.1 | — |

TABLE 5

| | Tensile of Weld Line Sample | | | | Flex of Weld Line Sample | |
|---|---|---|---|---|---|---|
| Examples | Avg-Peak Load lbf | StdDev-Peak Load lbf | Avg-Strain@Break % | StdDev-Strain@Break % | Avg-Peak Load lbf | StdDev-Peak Load lbf |
| Comparative A | 273.2 | 5.8 | 8.8 | 0.9 | 14.4 | 0.1 |
| Comparative B | 108.9 | 10.6 | 1.3 | 0.2 | 6.3 | 0.3 |
| Comparative C | 96.3 | 11.1 | 1.2 | 0.2 | 6.3 | 1.1 |
| Comparative D | 159.7 | — | 3.4 | — | — | — |
| Inventive 1 | 124.1 | 26.6 | 1.9 | 0.6 | 8.5 | 1.8 |
| Inventive 2 | 172.1 | — | 4.4 | — | — | — |
| Inventive 3 | 202.3 | — | 6.9 | — | — | — |
| Inventive 4 | 235.1 | 2.6 | 10.2 | 1.1 | 11.3 | 0.0 |
| Inventive 5 | 236.5 | — | 41.0 | — | — | — |
| Inventive 6 | 214.3 | — | 9.9 | — | — | — |
| Inventive 7 | 164.0 | — | 5.8 | — | — | — |

Test Methods

Test methods include the following:

Haze/Clarity

The haze/charity chip samples (60×60×2 mm plaques) are molded with Axxicon Mold Inserts.

B-insert. 60×60×2 mm plaque

A insert. Aim Minor insert. Polished NO/N1 (SPI-SPE 1-2) according ISO 1302

The clarity and haze of sample chips of 2 mm thickness were measured using BYK Gardner Haze-gard as specified in ASTM D1746 and ASTM D1003 and conditioned for at least 40 hrs at approximately 23° C. temperature before testing.

Tensile Properties

The Tensile samples (ASTM D 638 Type I Tensile bar) are molded with Axxicon Mold Inserts.
- B-insert. ASTM D 638 Type I Tensile. 165(6.5")×13 (0.5")×3.2(0.125") mm
- A-insert. Aim Minor insert. Polished NO/N1 (SPI-SPE 1-2) according ISO 1302

The tensile properties are determined in accordance with ASTM D 638. The stress-strain behavior of the sample are determined by elongating the specimen and measuring the load carried by the specimen at a rate of 2"/min and at least 5 specimens are tested per each sample and conditioned for at least 40 hrs at approximately 23° C. temperature before testing.

Izod Impact Strength

Notched Izod impact strength is measured in accordance with ASTM D 256 A at various temperatures using a Tinius Olsen Model 92T Impact Tester. The rectangular specimens were cut from the ASTM D638 Type I tensile bars (63.5 mm×12.7 mm×3 mm). The notch for the Izod impact specimens were milled notch and confirmed according to ASTM D256. The samples were notched using a notcher to produce a notch depth 2.54+/−0.05 mm. Five specimens of each sample were tested using ASTM D256 at room temperature, 23° C., 0° C., and −20° C. and conditioned for at least 40 hrs at room temperature before testing.

Flex Modulus

Flexular and 1 percent secant moduli are measured according to ASTM D-790. Samples are prepared by injection molding of tensile bars (approx. 16.5 mm×19 mm×3 mm) and conditioned for at least 40 hours at approximately 23° C. temperature.

Tensile Weld Line Strength

The Weld Line Tensile samples are ASTM D 638 Type I Weld Line Tensile and molded with Axxicon Mold Inserts.
- B-insert. ASTM D 638 Type I Weld Line Tensile. 165 (6.5")×13(0.5")×3.2(0.125") mm
- A-insert. Aim Minor insert. Polished NO/N1 (SPI-SPE 1-2) according ISO 1302

The weld line tensile strength is determined in accordance with ASTM D 638. The weld line strength was determined by elongating the specimen and measuring the peak load and strain at break carried by the specimen at a rate of 2"/min. Five specimens were tested per each sample.

The weld line flexural strength was measured according to ASTM D790 ( ). The peak load was recorded to characterize the weldline strength of various examples.

Melt Flow Rate (MFR) and Melt Index (I2)

Melt flow rate (MFR) in g/10 min for propylene-based polymers is measured using ASTM D 1238, condition is 230° C./2.16 kg. Melt index ($I_2$) in g/10 min for ethylene-based polymers is measured using ASTM D 1238, condition is 190° C./2.16 kg.

Density

Samples for density measurement are prepared according to ASTM D1928. Measurements are made using ASTM D792-B.

DSC Standard Method

Differential Scanning Calorimetry results are determined using a TA Instruments model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −90° C. at 10° C./min cooling rate and held at −90° C. for 3 minutes. The sample is then heated to 180° C. at 10° C./min. heating rate. The cooling and second heating curves are recorded.

The DSC melting peak temperature is measured as the maximum in heat flow rate (W/g) with respect to the linear baseline drawn between −30° C. and end of melting. The heat of fusion is measured as the area under the melting curve between −30° C. and the end of melting using a linear baseline. For the ethylene-based materials, the total percent crystallinity is equal to 100*enthalpy of sample/enthalpy of PE crystal where the enthalpy of a perfect polyethylene crystal is equal to 292 J/g as reported in Macromolelcular Physics, Vol. 1, Academic Press, New York, 1973, p. 154. For the propylene-based materials, The total percent crystallinity is equal to 100*enthalpy of sample/enthalpy of PP crystal where the enthalpy of a perfect polypropylene crystal is equal to 165 J/g as reported P. Edward, J. R. Moore, Polypropylene Handbook, Hanser Publisher, Cincinnati 1996.

Gel Permeation Chromatography (GPC)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polypropylene molecular weights using the following equation (as described in Williams and Ward, J. Polym. Sci., Polym. Let., 6, 621 (1968)): $M_{polypropylene}=0.645(M_{polystyrene})$. The polystyrene standard peak molecular weights are converted to polyethylene molecular weights using the following equation (as described in Williams and Ward, J. Polym. Sci., Polym. Let., 6, 621 (1968)): $M_{polyethylene}=0.431 (M_{polystyrene})$.

Polypropylene or polyethylene equivalent molecular weight calculations are performed using Viscotek TriSEC software Version 3.0 depending on the type of polymer analyzed.

Viscosity

Melt viscosity was measured using a Brookfield Viscometer Model DV-II equipped with a Brookfield Thermosel™ System. Melt viscosity can be determined in accordance to ASTM D1084 measured at 177° C.C. using spindle 31.

The present invention may be embodied in other forms without departing from the spirit and the essential attributes thereof, and, accordingly, reference should be made to the appended claims, rather than to the foregoing specification, as indicating the scope of the invention.

We claim:

1. A polyolefin blend composition comprising:
   (a) from 75 to 97 percent by weight of one or more random propylene copolymers having a DSC melting point in the range of from 120° C. to 160° C., and a melt flow rate (MFR) in the range of from 5 to 120 g/10 minutes;
   (b) from 3 to 25 percent by weight of one or more an ethylene α-olefin copolymers having a melt index ($I_2$) in the range of from 100 to 1500 g/10 minutes, a density in the range of 0.860 to 0.910 g/cm³, and a molecular weight ($M_w$) in the range of from 10,000 to 50,000 g/mole, wherein said ethylene α-olefin copolymer is homogenously branched copolymer, and wherein said ethylene α-olefin copolymer is linear or substantially linear, and wherein the ethylene α-olefin copolymers comprise greater than 50 mole percent of units derived from ethylene;
   (c) optionally from 5 to 15 percent by weight of one or more a propylene α-olefin interpolymers having a DSC melting point in the range of less than 110° C., a heat of fusion in the range of less than 50 Joules/gram, and a crystallinity in the range of from at least 1 percent by to 40 percent by weight, and a melt flow rate in the range of less than 80.

2. The composition of claim 1, wherein said composition is characterized by one or more of the followings:
   a. a haze in the range of from less than 55 percent, when said composition is formed into a plaque having a thickness of at least 2 mm;
   b. a normalized impact strength, measured at 23° C., in the range of from greater than 5 kJ/m²;
   c. a normalized weld line in the range of from greater 100 lbf; or
   d. an elongation at break of the weld line greater than 1.5 percent.

3. An article comprising said composition of claim 1.

4. The article of claim 1, wherein said article is a molded article.

5. The article or claim 4, wherein at least a portion of said molded article has a thickness in the range of from 1 mm to 5 mm.

6. A polyolefin blend composition of claim 1, wherein the one or more an ethylene α-olefin copolymers have a melt index ($I_2$) in the range of from 200 to 1250 g/10 minutes.

7. A polyolefin blend composition of claim 1, wherein the one or more an ethylene α-olefin copolymers have a melt index ($I_2$) in the range of from 201 to 1250 g/10 minutes.

8. The polyolefin blend composition of claim 1, wherein the composition comprises from 5 to 15 percent by weight of one propylene α-olefin interpolymer having a DSC melting point in the range of less than 110° C., a heat of fusion in the range of less than 50 Joules/gram, and a crystallinity in the range of from at least 1 percent by to 40 percent by weight, and a melt flow rate in the range of less than 80.

9. The polyolefin blend composition of claim 8, wherein the propylene α-olefin interpolymer is a propylene/ethylene copolymer, and wherein the propylene/ethylene copolymer has a melt flow rate from 5 to 30 g/10 min.

10. The composition of claim 1, wherein said composition is characterized by a haze value from 22 to 49.4 percent, when said composition is formed into a plaque having a thickness of at least 2 mm; and an Izod impact strength, measured at 23° C., from 6.7 to 11 kJ/m².

* * * * *